US009057874B2

(12) United States Patent
Seder et al.

(10) Patent No.: US 9,057,874 B2
(45) Date of Patent: Jun. 16, 2015

(54) VIRTUAL CURSOR FOR ROAD SCENE OBJECT SELECTION ON FULL WINDSHIELD HEAD-UP DISPLAY

(75) Inventors: Thomas A. Seder, Northville, MI (US); Joseph F. Szczerba, Grand Blanc, MI (US); Dehua Cui, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 224 days.

(21) Appl. No.: 12/982,478

(22) Filed: Dec. 30, 2010

(65) Prior Publication Data
US 2012/0174004 A1  Jul. 5, 2012

(51) Int. Cl.
*G02B 27/01* (2006.01)

(52) U.S. Cl.
CPC .......... *G02B 27/01* (2013.01); *G02B 2027/014* (2013.01); *G02B 2027/0187* (2013.01)

(58) Field of Classification Search
CPC ......... G06F 3/011; G06F 3/013; G02B 27/01; G02B 27/0118; G60R 25/25; G60R 25/255
USPC ................ 715/764; 345/7; 340/435, 903, 905
See application file for complete search history.

(56) References Cited

U.S. PATENT DOCUMENTS

| | | | |
|---|---|---|---|
| 5,668,907 A * | 9/1997 | Veligdan ........................ 385/120 |
| 5,689,619 A * | 11/1997 | Smyth ............................. 706/45 |
| 6,986,581 B2 | 1/2006 | Sun et al. |
| 6,988,026 B2 * | 1/2006 | Breed et al. ................... 701/31.4 |
| 7,047,265 B2 * | 5/2006 | Peterson et al. ............... 708/313 |
| 7,090,355 B2 | 8/2006 | Liu et al. |
| 7,103,460 B1 * | 9/2006 | Breed ........................... 701/32.9 |
| 7,126,583 B1 * | 10/2006 | Breed ............................ 345/158 |
| 7,182,467 B2 | 2/2007 | Liu et al. |
| 7,213,923 B2 | 5/2007 | Liu et al. |
| 7,415,126 B2 * | 8/2008 | Breed et al. ................... 382/100 |
| 7,421,321 B2 * | 9/2008 | Breed et al. ................... 701/33.6 |
| 7,460,951 B2 | 12/2008 | Altan et al. |
| 7,860,626 B2 * | 12/2010 | Breed ............................ 701/49 |
| 7,920,102 B2 * | 4/2011 | Breed ................................ 345/7 |
| 8,098,170 B1 | 1/2012 | Szczerba et al. |
| 8,098,171 B1 | 1/2012 | Szczerba et al. |
| 8,818,647 B2 * | 8/2014 | Breed ............................ 701/49 |
| 2003/0209893 A1 * | 11/2003 | Breed et al. ................... 280/735 |
| 2004/0073557 A1 * | 4/2004 | Piccionelli et al. ............ 707/100 |
| 2005/0093719 A1 * | 5/2005 | Okamoto et al. ............ 340/995.1 |
| 2005/0111100 A1 * | 5/2005 | Mather et al. .................. 359/464 |
| 2006/0282204 A1 * | 12/2006 | Breed ............................ 701/49 |
| 2006/0284839 A1 * | 12/2006 | Breed et al. ................... 345/156 |
| 2007/0057781 A1 * | 3/2007 | Breed ........................ 340/457.1 |
| 2007/0154067 A1 * | 7/2007 | Laumeyer et al. ............. 382/103 |

(Continued)

OTHER PUBLICATIONS

U.S. Appl. No. 12/467,340, Szczerba et al.

(Continued)

*Primary Examiner* — Tuyetlien Tran
*Assistant Examiner* — Patrick Ramsey (57) ABSTRACT

A method to select a feature in a view in front of a vehicle includes monitoring the view in front of the vehicle visible through a graphic projection display, monitoring a user input to the graphic projection display, determining the selected feature based upon the monitored view and the monitored user input, determining a registered graphic representing the selected feature for display upon the graphic projection display, and displaying the registered graphic upon the graphic projection display.

17 Claims, 5 Drawing Sheets

(56) References Cited

U.S. PATENT DOCUMENTS

| | | | |
|---|---|---|---|
| 2007/0194902 A1* | 8/2007 | Blanco et al. | 340/461 |
| 2008/0018555 A1* | 1/2008 | Kuo et al. | 345/8 |
| 2008/0027635 A1* | 1/2008 | Tengler et al. | 701/209 |
| 2008/0157946 A1* | 7/2008 | Eberl et al. | 340/435 |
| 2008/0158096 A1* | 7/2008 | Breed | 345/7 |
| 2008/0158510 A1* | 7/2008 | Tant et al. | 353/14 |
| 2008/0276191 A1* | 11/2008 | Breed | 715/771 |
| 2009/0115847 A1* | 5/2009 | Anderson | 348/148 |
| 2009/0268946 A1 | 10/2009 | Zhang et al. | |
| 2009/0319178 A1* | 12/2009 | Khosravy et al. | 701/207 |
| 2010/0020078 A1* | 1/2010 | Shpunt | 345/420 |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |
| 2010/0253542 A1 | 10/2010 | Seder et al. | |
| 2010/0253543 A1 | 10/2010 | Szczerba et al. | |
| 2010/0253593 A1 | 10/2010 | Seder et al. | |
| 2010/0253594 A1 | 10/2010 | Szczerba et al. | |
| 2010/0253595 A1 | 10/2010 | Szczerba et al. | |
| 2010/0253596 A1 | 10/2010 | Szczerba et al. | |
| 2010/0253597 A1 | 10/2010 | Seder et al. | |
| 2010/0253598 A1 | 10/2010 | Szczerba et al. | |
| 2010/0253599 A1 | 10/2010 | Szczerba et al. | |
| 2010/0253600 A1 | 10/2010 | Seder et al. | |
| 2010/0253601 A1 | 10/2010 | Seder et al. | |
| 2010/0253602 A1 | 10/2010 | Szczerba et al. | |
| 2010/0253688 A1 | 10/2010 | Cui et al. | |
| 2010/0253918 A1 | 10/2010 | Seder et al. | |
| 2010/0254019 A1 | 10/2010 | Cui et al. | |
| 2010/0289632 A1 | 11/2010 | Seder et al. | |
| 2010/0292886 A1 | 11/2010 | Szczerba et al. | |
| 2010/0295945 A1* | 11/2010 | Plemons et al. | 348/148 |
| 2011/0052009 A1* | 3/2011 | Berkovich et al. | 382/106 |
| 2011/0064312 A1* | 3/2011 | Janky et al. | 382/195 |
| 2011/0109618 A1* | 5/2011 | Nowak et al. | 345/419 |
| 2012/0089273 A1 | 4/2012 | Seder et al. | |
| 2012/0093357 A1 | 4/2012 | Seder et al. | |
| 2012/0169513 A1 | 7/2012 | Szczerba et al. | |
| 2012/0169572 A1 | 7/2012 | Seder et al. | |
| 2012/0169861 A1 | 7/2012 | Szczerba et al. | |
| 2012/0173067 A1 | 7/2012 | Szczerba et al. | |
| 2012/0173069 A1 | 7/2012 | Tsimhoni et al. | |
| 2012/0176410 A1* | 7/2012 | Meier et al. | 345/633 |
| 2012/0224060 A1* | 9/2012 | Gurevich et al. | 348/148 |

OTHER PUBLICATIONS

U.S. Appl. No. 12/467,350, Seder et al.
U.S. Appl. No. 12/900,566, Szczerba et al.
U.S. Appl. No. 12/903,267, Seder et al.
U.S. Appl. No. 12/900,539, Seder et al.
U.S. Appl. No. 12/980,503, Szczerba et al.
U.S. Appl. No. 12/979,432, Szczerba et al.
U.S. Appl. No. 12/980,522, Seder et al.
U.S. Appl. No. 12/980,612, Szczerba et al.
U.S. Appl. No. 12/981,206, Tsimhoni et al.
U.S. Appl. No. 12/981,602, Szczerba et al.

* cited by examiner

VIRTUAL CURSOR FOR ROAD SCENE OBJECT SELECTION ON FULL WINDSHIELD HEAD-UP DISPLAY

TECHNICAL FIELD

This disclosure is related to user input coordinated to with a graphic display device.

BACKGROUND

The statements in this section merely provide background information related to the present disclosure and may not constitute prior art.

Presentation of information to the operator of a vehicle in an effective manner is desirable and reduces strain upon the operator. Head-up displays project light upon a screen and the light is converted into a viewable representation upon the screen. Head-up displays are known to present information to the operator of the vehicle in an effective manner by reducing strain upon the operator while allowing the operator to remain focused on driving.

Vehicle systems utilizing driving aids such as adaptive cruise control (ACC), automatic lateral control, collision avoidance or preparation systems, and lane keeping aids monitor and process information regarding the operating environment surrounding the vehicle. Information is available from a variety of sources to locate the vehicle in relation to a 3D map database, plan a travel route for the vehicle to a destination, and correlate this travel route to available information regarding the route. On-board vehicle systems provide a wide variety of information that can be used to improve control of the vehicle. Vehicle to vehicle communications are known to utilize data collected in one vehicle in communicating with vehicles elsewhere on the road. Infrared sensors are known to detect features in a view based upon difference in infrared light emissions.

Input from a vehicle operator or occupant can be monitored or received from a number of sources. Buttons, levers, steering wheels, pedals, and other similar input devices permit a person to input control settings to a vehicle. Inputs to a graphical device, such as a touch screen display, are known.

SUMMARY

A method to select a feature in a view in front of a vehicle includes monitoring the view in front of the vehicle visible through a graphic projection display, monitoring a user input to the graphic projection display, determining the selected feature based upon the monitored view and the monitored user input, determining a registered graphic representing the selected feature for display upon the graphic projection display, and displaying the registered graphic upon the graphic projection display.

BRIEF DESCRIPTION OF THE DRAWINGS

One or more embodiments will now be described, by way of example, with reference to the accompanying drawings, in which.

DETAILED DESCRIPTION

Figure 1:
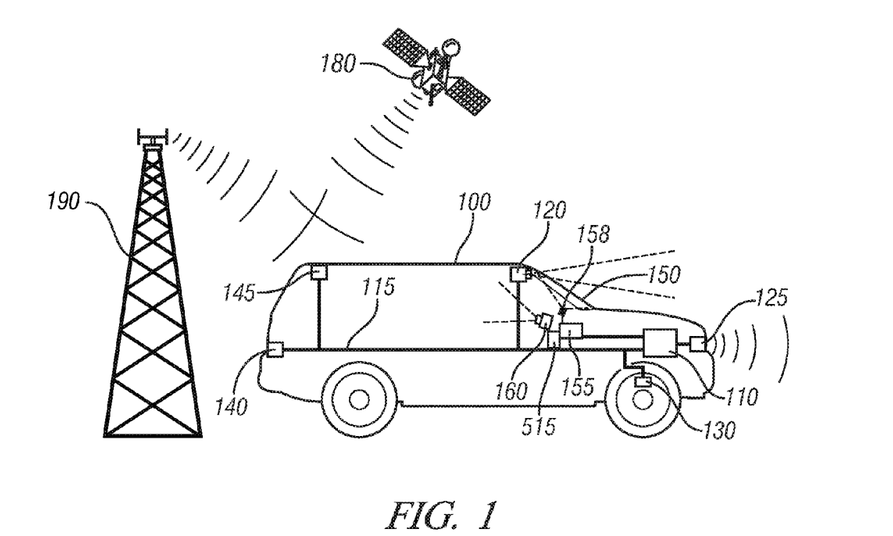
FIG. 1 illustrates an exemplary vehicle equipped with an enhanced vision system, in accordance with the present disclosure.

Referring now to the drawings, wherein the showings are for the purpose of illustrating certain exemplary embodiments only and not for the purpose of limiting the same, FIG. 1 illustrates an exemplary vehicle equipped with an enhanced vision system. An exemplary EVS system is disclosed in co-pending U.S. application Ser. No. 12/417,077, which is incorporated by reference. Exemplary vehicle 100 includes an EVS system manager 110; a user input module (UIM) 515; vehicle sensor systems, including camera system 120 and radar system 125; vehicle operation sensors, including vehicle speed sensor 130; information systems, including GPS device 140 and wireless communication system 145; head-up display (HUD) 150; EVS graphics system 155; graphics projection system 158; and occupant eye location sensing system 160. The EVS system manager 110 can communicate directly with various systems and components, or the EVS system manager can alternatively or additionally communicate over a LAN/CAN system 115. EVS system manager 110 communicates with EVS graphics system 155 in order to project graphics upon HUD 150. However, EVS system manager 110 can communicate with EVS graphics system 155 to instead or additionally project graphics upon other surfaces within the vehicle to accomplish methods disclosed herein. Discussed in further detail with reference to FIG. 4, the UIM 515 can receive user inputs indicated to a portion of a display device, wherein the user inputs are monitored by the EVS system manager 110. Camera system 120 includes a camera or image capturing device taking periodic or sequential images representing a view from the vehicle. Radar system 125 includes a device known in the art utilizing electromagnetic radiation to detect other vehicles or objects located near the vehicle. A number of known in-vehicle sensors are widely used within a vehicle to monitor vehicle speed, engine speed, wheel slip, and other parameters descriptive of the operation of the vehicle. Vehicle speed sensor 130 represents one such an in-vehicle sensor, but the scope of the disclosure includes any such sensors for use by the EVS. GPS device 140 and wireless communication system 145 communicate with resources outside of the vehicle, for example, satellite system 180 and cellular communications tower 190. GPS device 140 may be utilized in conjunction with a 3D map database including detailed information relating to a global coordinate received by the GPS device 140 regarding the current location of the vehicle. Information from the vehicle sensor systems and the vehicle operation sensors can be utilized by the EVS system manager 110 to monitor the current orientation of the vehicle. HUD 150 includes a windscreen equipped with features capable of displaying an image projected thereupon while remaining transparent or substantially transparent such that occupants of the vehicle can clearly observe outside of the vehicle through the windscreen. HUD 150 can include a portion of the windscreen, for example, a portion including the driver side half of the windscreen, or HUD 150 can include substantially the full windscreen. One will appreciate that while HUD 150 includes the windscreen in the front of the vehicle, other surfaces within the vehicle could be used for projection, including side windows and a rear window. Additionally, the view on the front windscreen could be continued upon the front vehicle "A-pillars" and onto the side windows as a continuous image. EVS graphics engine 155 includes display software or programming translating requests to display information from the EVS system manager 110 in graphical representations of the information. The EVS graphics engine 155 includes programming to compensate for the curved and tilted surface of the windscreen and any other surfaces (e.g., non-transparent component 280 shown in FIG. 2) onto which graphics are to be projected. EVS graphics engine 155 controls graphics projection system 158 including a laser or projector device producing an excitation light to project the graphical representations. Exemplary occupant eye location sensing system 160 includes sensors known in the art to approximate a location of the head of an occupant and further the orientation or gaze location of the eyes of the occupant. Based upon the output of the occupant eye location sensing system 160, the current location and orientation of the vehicle 100 and a user input location, EVS system manager 110 can accurately dynamically register the graphical representations to the HUD 150 such that the occupant sees the images overlaid with visual images through the windscreen. Dynamic registration of graphics will be discussed in greater detail with reference to FIG. 5.

Figure 2:
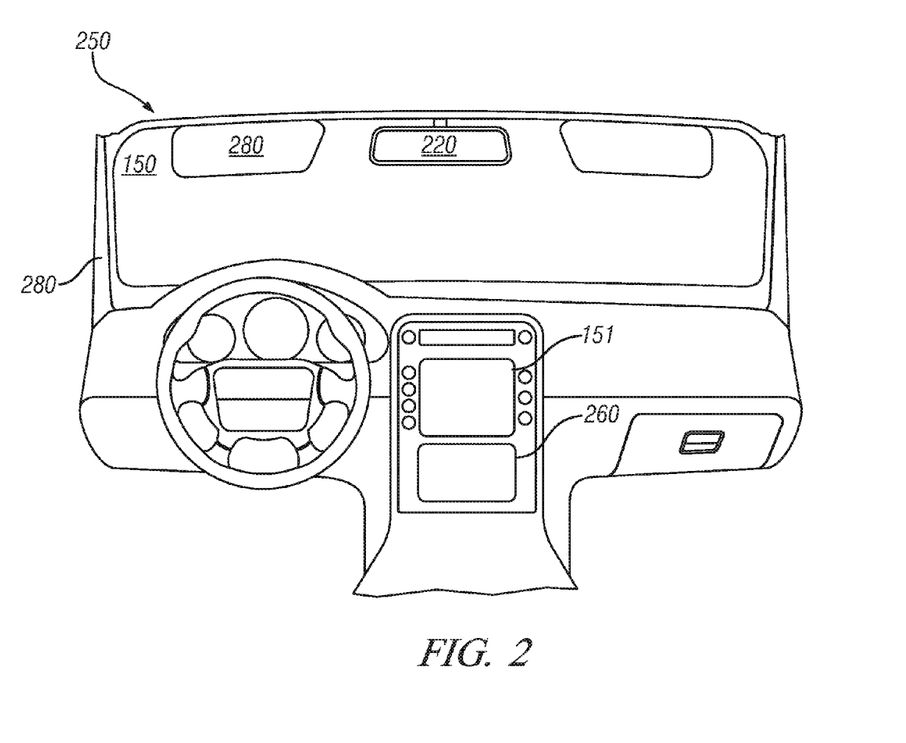
FIG. 2 illustrates exemplary embodiments of the graphic projection display, in accordance with the present disclosure.

Information can be presented to a user of a vehicle according to a number of exemplary embodiments. A number of video devices can be utilized to present information to the user. However, presenting the information within a context for the user of a view of the operation environment of the vehicle reduces visual complexity for control of the vehicle. A graphic projection display can be used to display graphics in the context of a view in front of the vehicle. A graphic projection display 250 and the associated graphics can be utilized according to a number of exemplary embodiments. FIG. 2 illustrates exemplary embodiments of the graphic projection display including a substantially transparent windscreen HUD 150, a touch screen display 260, a human machine interface (HMI) 151 including a display, non-transparent components 280 and a display monitor 270 mounted within the interior of the vehicle. It will be understood that any of the depicted embodiments included with the graphic projection display 250 can project graphics corresponding to and registered to a view of the driving scene of the vehicle upon the display.

According one embodiment, graphic projection display 250 can include HUD 150, presenting information to the user in the context of the view through the HUD. The HUD is a transparent windscreen with small luminescent particles or structures embedded within the windscreen. As a result, the user can still see through the windscreen, for example, observing another vehicle in traffic in front of the user's vehicle. When the laser excitation light is projected upon the windscreen, the luminescent particles or structures emit visible light back to the user. However, this emitted light does not interfere with the user seeing through the windscreen. For example, the user can still see the vehicle in front of the user's vehicle, and the EVS system manager can direct a graphic including a box to be drawn upon a location of the windscreen and of a correct size such that the user sees a dynamically registered box drawn around the vehicle in front of the user's vehicle. As a result, HUD 150 can act as graphic projection display 250, projecting graphics superimposed upon or corresponding to a view of the driving scene of the vehicle.

Figure 3:
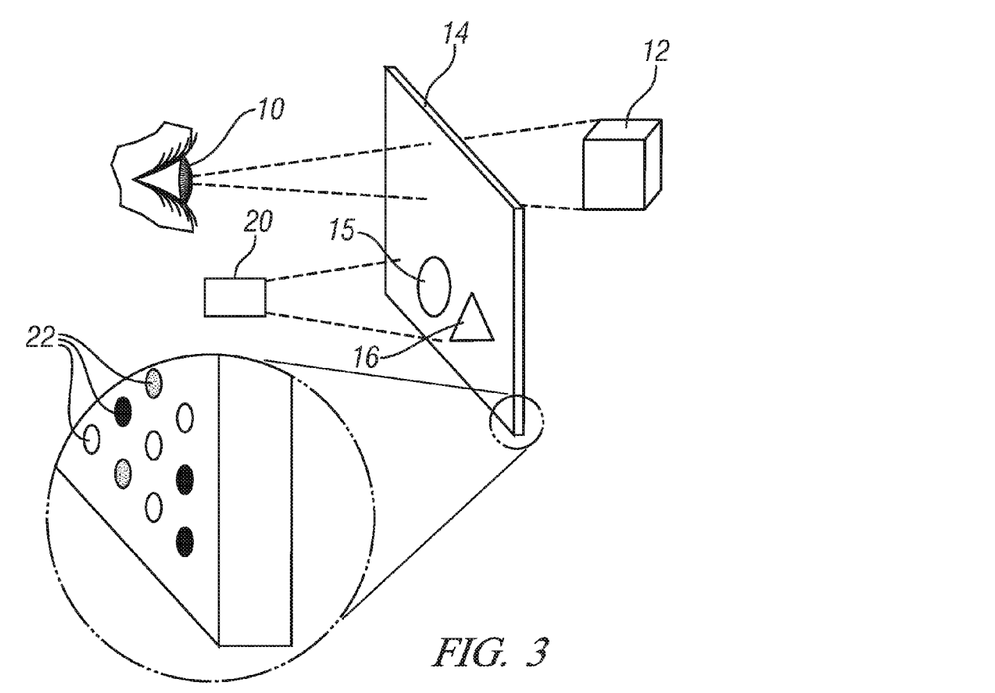
FIG. 3 is an example diagram of a substantially transparent display, in accordance with the present disclosure.

FIG. 3 illustrates a substantially transparent display. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

FIG. 3 illustrates illumination of substrate 14 illuminated with excitation light (e.g. ultraviolet light or infrared light) from light sources (e.g. a projector or laser), represented by device 20. The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

In one embodiment, the excitation light is output by device 20 including a projector. The projector may be a digital projector. The projector may be a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. The projector may be a liquid crystal display (LCD) projector. The projector may be a liquid crystal on silicon (LCOS) projector. The projector may be an analog projector (e.g. a slide film projector or a movie film projector). One of ordinary skill in the art would appreciate other types of projectors which may be used to project ultraviolet light on substrate 14.

In another embodiment, an excitation light is output from device 20, including a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 3 illustrates light emitting material (e.g. light emitting particles 22) dispersed in a substantially transparent substrate. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

FIG. 3 illustrates light emitting material, including light emitting particles 22, dispersed in a substantially transparent substrate. These light emitting particles 22 can be substantially similar particles throughout, or, as illustrated in FIG. 3 the particles can vary in composition. When excitation light is absorbed by the light emitting particles 22, the particles emit visible light. Accordingly, in down-conversion embodiments, when ultraviolet light is absorbed by light emitting particles, visible light is emitted from the light emitting particles. Likewise, in up-conversion embodiments, when infrared light is absorbed by light emitting materials, visible light is emitted from the light emitting particles. Each light emitting particle may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as illustrated in FIG. 3, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. Each of the light emitting particles may have a diameter that is less than about 400 nanometers. According to embodiments, each of the light emitting particles may have a diameter that is less than about 300 nanometers, less than about 200 nanometers, less than about 100 nanometers, or less than about 50 nanometers. The light emitting particles may be individual molecules.

According to another embodiment of graphic projection display 250, a display screen can be utilized to present information to the user in the context of the view. An exemplary HMI device 151 includes a display associated therewith for receiving a projected image of a view corresponding to the view of a driving scene of the vehicle and representing information for the user superimposed or coordinated with the view. HMI 151 includes a computing device where the operator of the vehicle can input commands to control various systems of the vehicle in signal communication with the HMI 151 and receive desirable information. For instance, utilizing the HMI 151, the user can provide input based upon the scene viewable through or on the display. Methods of projection upon HMI displays are known in the art and this disclosure is not meant to be limited to any one method of projection. HMI 151 can act as graphic projection display 250, projecting graphics superimposed upon or corresponding to a view of the driving scene of the vehicle.

According to another embodiment of graphic projection display 250, a touch screen device 260 can be utilized. Touch screen devices are well known in the art and will not be discussed in detail herein. Touch screen device 260 can act as graphic projection display 250, projecting graphics superimposed upon or corresponding to a view of the driving scene of the vehicle.

According to another embodiment of graphic projection display 250, the graphic projection display can include the non-transparent components 280 for receiving a projected image of a view corresponding to the driving scene of the vehicle and representing a graphic superimposed upon or corresponding to the view. The non-transparent components 250 can include a dashboard, seats, headrests, structural pillars, roofs, sun visors and steering wheels. The non-transparent components 250 can include a transparent phosphor film reactive to display graphics in response to an excitation projector. Methods of projection are discussed above with reference to the substantially transparent windscreen HUD 150 and will not be discussed with reference to the non-transparent component 280. Co-pending U.S. application Ser. No. 12/563,407 is incorporated herein by reference and discloses projecting images and graphics upon non-transparent components. In alternative embodiments, the non-transparent component 250 can include the pixelated field of view limited architecture, discussed below with reference to FIGS. 7 and 8, when discussing the projection of dynamically registered graphics upon the HUD 150 and alternatively the non-transparent components 280.

The EVS system manager 110 includes a programmable processor including programming to monitor a user input indicated to a portion of the graphic projection display 250 and determine a graphic to be displayed based upon the user input. It will become apparent that the graphics displayed upon the display can be utilized to provide information to the user based upon user input. For example, a user can provide input indicating a desire to receive information regarding a feature of the view visible through graphic projection display 250. Non-limiting examples of such a feature can include a navigable feature of the road, such as an off-ramp of a highway; another vehicle; a building; a parking lot; an advertising sign; and a sign indicating a possible navigation destination, such as a town or point of interest.

Based upon a user input, information about something in the view in front of the vehicle can be queried. As indicated in U.S. application Ser. No. 12/417,077, incorporated by reference above, and as is known according to methods known in the art, a number of methods are known to determine a location of a vehicle. Based upon the location of the vehicle, information regarding the surroundings of the vehicle can be ascertained, for example, through a wireless communications network and/or a 3D map database. Further, images captured through a camera device can be processed through methods known in the art to identify features in the images. For example, lines and corners in an image can be identified as a building. Utilizing the determined location and orientation of the vehicle and the identified portion of the image representing a building, the EVS system manager can access information about the object and formulate a graphic to represent the object. Information regarding the object can take a number of forms. Of the exemplary features that can be queried indicated above, a number of exemplary forms of information can be envisioned. A graphic representing a navigable feature of a road available for travel can include information representing a name, a road surface description, or other configurable information such as a distance to a closest gas station upon the road. A graphic representing a feature embodied as another vehicle can include a distance to the other vehicle, a projected trajectory of the other vehicle, and/or a color or textual warning if the selected vehicle acts in a manner indicating a threat to the user's vehicle. A graphic representing a feature embodied as a building can include information representing a name of the building or a business located therein, an address, or hours of operation for the business. A graphic representing a feature embodied as a parking lot can include information such as a cost of parking in the lot, a measure of how many/whether are available, and businesses proximate to the lot. A graphic representing a feature embodied as an advertising sign can include information such as a concise description of the goods or services offered, registered graphics upon the roadway representing a route to the advertised business, and prices. A graphic representing a feature embodied as a sign indicating a possible navigation destination, such as a town or point of interest, can include information such as a name of the destination or a brief description of services or landmarks at the destination. For example, a sign indicating a ball park can indicate a time of the next game to be played there and the price of a ticket.

A graphic can be used to confirm selection of a feature in the view. According to one example, a selection box can be placed around the identified feature in the view. According to another example, the user can drag a cursor or identifying box around the display to a selected feature. Once a feature is selected, the eye location of the user can be used to track the selected feature such that the box or identifying cursor remains on or registered to the feature.

A user input can be identified to select a feature in the view in front of the vehicle. In an exemplary embodiment wherein graphic projection system 250 is a video screen, a touch screen display, or a projection upon a non-transparent surface, the indication by the user can be directly to the portion of the image with the feature displayed. In an exemplary embodiment wherein graphic projection system is a HUD device and wherein the input device is a trackball or keyboard-type input device, a cursor display or a graphic indicator permitting feature selection upon the HUD can be controlled by the input device and moved to a location of the HUD. Based upon an eye location of the user and the location of the cursor, a corresponding feature in the view can be determined based upon location of the cursor and a selection by the user. Similarly, if the graphic device is a HUD, and hand gestures of the user are monitored as an input, the location of the eyes of the user, the location of the hand during the hand gesture, and the location of features in the view in front of the vehicle can be utilized to permit feature selection.

A number of methods to monitor and interpret hand gestures as inputs are envisioned. For example, a point gesture, with a pointed finger moving and stopping at a location can create at the end point of the finger a data point and an implied desire of the user to select based upon the data point. According to another exemplary embodiment, a pointed finger can be used in cooperation with a selection indication, such as a button located on the steering wheel or a spoken selection, such as monitoring for the word "select" by the user. According to another exemplary embodiment, a defined gesture such a user bringing an index finger and a thumb together can be used to indicate a selection. According to another exemplary embodiment, a learning mode can be utilized permitting the user to customize a hang gesture and a corresponding point or area of the view to be selected based upon the gesture.

Selection of a feature according to any of the above disclosed methods can include a number of methods to interpret the input to features in the view. For example, a user input to a portion of the display can be taken literally, with a precise pin-point identification of a feature based upon the input by the user. In such an example, a determination can be made to a pixel or an imaginary point in the view corresponding to the user input, and a feature can be identified at that pixel or point. In another example, a user input to a view or a portion of a display can be interpreted, and a feature or a list of candidate features to be selected can be identified based upon a view distance from the indication of the user input. Additionally, features in the view can be identified and prioritized. For example, if a building and a tree are identified features within a view, and a user input is indicated between the building and the tree, a method to prioritize that the user is more likely to be interested in the building than the tree can be utilized. In an event that a plurality of potentially interesting features in a view are proximate to the user input, the features can each be displayed for subsequent selection by the user or a first feature can be displayed with an additional graphic indicating that a subsequent user input to a same location can cycle the display to another feature. A number of methods to interpret a user input are envisioned, and the disclosure is not intended to be limited to the particular exemplary embodiments included herein.

Figure 4:
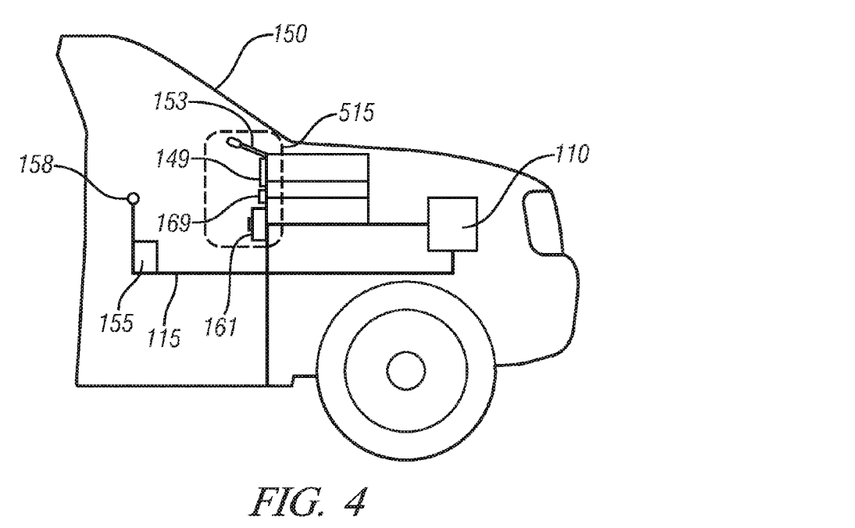
FIG. 4 illustrates an exemplary user input module for receiving user inputs indicated to a portion of the graphic projection display, in accordance with the present disclosure.

Referring to FIG. 4, an exemplary user input module (UIM) 515 for receiving user inputs indicated to a portion of the graphic projection display 250 is illustrated. The user inputs are monitored by the EVS system manager 110 and may be utilized for representing graphics upon the graphic projection display 250 corresponding to the driving scene. The UIM 515 includes embodiments of user input devices and modules, and that the exemplary vehicle may only include one of the input devices and modules included within the UIM 515 for receiving and monitoring a user input indicated to a portion of the graphic projection display 250. However, embodiments are envisioned where the vehicle can include variations of the user input devices and modules included within the UIM 515 and selected ones can be enabled based on a vehicle user's preference. Exemplary UIM 515 includes an imaging device 161, a touch screen input module (TSIM) 149, a controller device 153 and a keyboard device 161.

TSIM 149 can be configured to receive touch gestures of a hand or finger of the user upon the module and indicated to a portion of the graphic projection display corresponding to the driving scene. The TSIM 149 can additionally include a display corresponding to the driving scene of the vehicle and configured to dynamically register graphics thereon (see TSIM 149 embodied as a touch screen display 260 known in the art and represented in FIG. 4). As will become apparent, the received touch gestures of the hand of the user provides a touch-based user interface for determining selection of options through the display.

Various devices are known in the art that can receive touch gestures of a hand or finger of a user. The TSIM 149 can be a touch screen device including a display screen which can identify the occurrence, location and position of a touch inside a region of the display. According to one embodiment, the display can include a view of the driving scene of the vehicle. According to another embodiment, for example when providing alternative options for selection, the representation can include selected images for selection. For example, providing a navigational choice, the display could show one half of the screen with a textual message, for example, providing an option to maintain a currently selected route, and the other half of the screen with a segment of the view of the driving scene including a sign showing a street name or exit number providing the user with an option to selected the displayed street sign to alter the planned navigational route. The TSIM 149 can be integrated within the HMI device 151 (see FIG. 2). The TSIM 149 can be embodied as a handheld device such as a personal digital assistant (PDA) or a cell phone, all having displays including the driving scene of the vehicle. The TSIM 149 facilitates a user to interact with what is displayed on the display (i.e., the driving scene), rather than indirectly with a mouse or touchpad and it lets the user perform the touch gestures without necessitating such intermediary devices. Such methods to display options for selection can include graphical prompts such as an icon or flashing box indicator around a displayed item, audio prompts, or a number of other features known in the art to quickly convey to the user information to facilitate the selection of options being presented.

Furthermore, various methods are known in the art for monitoring and receiving touch gestures of the hand or finger of the user. In a non-limiting embodiment, the TSIM 149 can be a resistive touch screen display composed of standard glass sheet that is coated with a thin conductive and a resistive metallic sheet, wherein an electrical current travels between the two layers and monitors the touch gesture when the two layers contact each other in the same location and thereby interrupting the electrical current. In another non-limiting embodiment, the TSIM 149 can be a surface wave touch screen display utilizing ultrasonic waves to process user inputs from the screen. In this embodiment, the surface wave touch screen display utilizes a transducer identifying if a signal has been altered by a touch at any movement, where ultrasonic waves flow over the entire screen when the user touches the display at a specific location. In yet another non-limiting embodiment, the TSIM 149 can be a capacitive touch screen display composed of an indium tin oxide sheet that stores electrical charge and is positioned on a glass layer of the display. When the hand or finger of the user input contacts the display, a small quantity of the charge is transmitted to the hand or finger of the user and the quantity of charge on the capacitive sheet reduces. A processor associated therewith computes the comparative variation and determines the precise location where the touch-gesture took place, the location corresponding to the location on the driving scene of the vehicle. In yet another non-limiting embodiment, the TSIM 149 can include infrared touch screen displays. Infrared touch screen displays can react to infrared or thermal waves (i.e., heat). Infrared touch screen displays can further utilize vertical and horizontal infrared sensors around the perimeter to create a grid, and thus pinpoint the exact location where the display screen has been touched by the hand or finger of the user.

It should be appreciated that the TSIM 149 is not to be limited to any of the devices and methods discussed above and that the TSIM 149 only be capable of receiving touch gestures of a hand or finger of the user upon the module 149 and indicated to a portion of the graphic projection display 250 corresponding to the driving scene. The controller device 153 can include a mechanism, such as a joystick, mouse, lever, stylus, touch pad or other accessory for receiving user manipulations indicated to a portion of the graphic projection display 250.

The imaging device 161 can include capturing images of the hand of the user and utilizing software associated therewith to monitor the location and orientation of the hand of the user to provide an optical image. The images can be captured utilizing infrared and/or ultraviolet technology. The optical image can be processed to generate three-dimensional (3D) mapping of the hand movement of the user. As will become apparent, the optical image of the hand movement provides a gesture-based user interface. Therefore, user hand movements (i.e., gesturing) detected by the imaging device 161 can be used in place of tactile interface elements such as a mouse, lever, joystick, knob or other accessory. According to one exemplary embodiment, the imaging device 161 requires capturing a sequence of images, wherein the location and the orientation of the hand of the user is monitored for each image to provide the optical image of the hand movement of the user. The software associated with the imaging device 161 can be integrated within the imaging device 161 and in signal communication with the EVS system manager 110 by suitable dedicated circuitry. Additionally, the software associated with the imaging device 161 can be integrated within the EVS system manager 110.

Various methods are known in the art that use imaging devices to process optical images based on the monitored location and orientation of an object (i.e., a hand) to generate 3D mapping of the object. PCT International Publication WO 2007/043036, which is incorporated herein by reference, discloses a method and system based on projecting a laser speckle pattern onto an object, and then analyzing an image of the pattern on the object. U.S. Pat. No. 6,100,517, which is incorporated herein by reference, discloses a method of using pulsed modulation in order to measure time of flight of light from an object to a detector, where a camera creates an image indicating distances to points in objects in a scene. U.S. Publication No. 2010/0020078 A1, which is incorporated herein by reference, discloses a method of illuminating an object with beams of radiation and generating intensity-based 3D mapping of the object. The present disclosure is not limited to any of the methods discussed above, and can include any device capable of monitoring a hand movement to provide a gesture-based input.

As an alternative or additional source of inputs, the keyboard device 169 can receive user keystrokes to the keyboard device indicated to a portion of the graphic projection display 250. The keyboard device 169 can be used in association with other devices such as the controller device having a joystick or the HMI. Keyboard devices can include alpha-numeric inputs, for example, including a miniaturized keyboard utilized with a computer or cell phone device. In another embodiment, the keyboard can include a select number of keys, for example, with five buttons labeled by letters A through E or by different color keys. Displays offered for selection could include icons matching the labels of keys on the keyboard device 169. As will become apparent, the received user keystrokes to the keyboard device 169 provides a key-based interface.

HMI device 151 can be utilized to receive user inputs. Methods are known to sense a touch to an area of HMI device 151. Alternatively, buttons can be used associated with the HMI device 151 and graphically cued to selections that are presented upon the HMI device.

Figure 5:
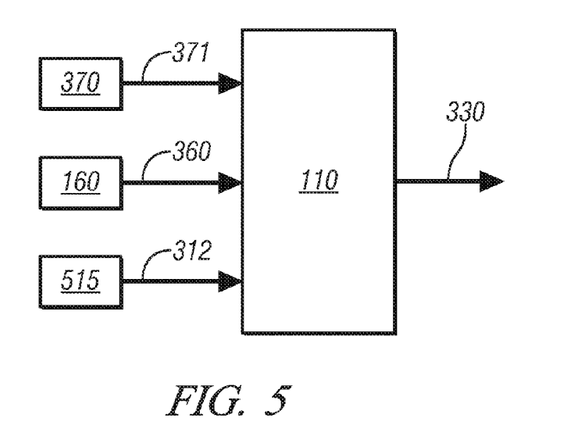
FIG. 5 illustrates an exemplary information flow for dynamically registering a graphic on a driving scene utilizing the graphic projection display, including an EVS system manager monitoring inputs to generate display requirements, in accordance with the present disclosure.

FIG. 5 illustrates an exemplary information flow for dynamically registering a graphic on a driving scene utilizing the graphic projection display 250 including an EVS system manager 110 monitoring inputs 360 from the occupant eye location sensing system 160, inputs 371 from a vehicle location and orientation module 370, and inputs 312 from the UIM 515 to thereby generate display requirements 330. By monitoring and combining information from various sources such as inputs 371, 360, and 312, EVS system manager 110 can operate a method or methods to create dynamically registered information regarding the operation of the vehicle and its operating environment upon a display device or windscreen HUD device including operator input to the graphic display.

With reference to FIGS. 1 and 5, the occupant eye location sensing system 160 includes sensors known in the art to approximate a location of the head of an occupant and further the orientation or gaze location of the eyes of the occupant. An occupant can be an operator or user of the vehicle or a passenger within the vehicle. Head and eye sensing devices are known in the art and will not be discussed in great detail herein. For the purposes of this disclosure, a camera based device is utilized in combination with image recognition software to estimate a three-dimensional head location within the vehicle, able to be coordinated with a vehicle coordinate system, and a direction of occupant's gaze based upon image recognition programming. An eye location input 360 is input to the EVS system manager 110.

The UIM 515 can be configured to monitor the user input location indicated to a portion of graphic projection display corresponding to the driving scene. A location of a view of an object through the HUD device can be calculated. Such a method, determining a location of a view of an object upon a HUD device based upon a location of the object and the eye location of the operator/user, is disclosed in co-pending U.S. application Ser. No. 12/726,444, which is incorporated herein by reference. The user input location refers to the location upon the display or HUD device to which the gesture of the user is directed. In some embodiments, the location of the display corresponding to a user input location can include text or a graphic indicating a selection that can be made. In some embodiments, an object visible through the HUD device defines the location or portion of the HUD device corresponding to a user input location that can be pointed to indicate selection of the object. For example, if a potential destination is visible through a center-left portion of the HUD device, a user hand gesture, based upon the eye location of the user relative to the HUD device and a determined location of the view of potential destination upon the HUD device, pointing to the center-left portion of the HUD device can be interpreted as a user input location corresponding to the potential destination. In another exemplary embodiment, a user input location can be determined by gaze location, for example, with an exemplary selector button on a steering wheel permitting the user to indicate selection to a portion of the display based upon the user's gaze location when the selector button is depressed. By determining, based upon the location of the user, where a hand gesture is indicated to upon HUD device, a user input location 312 is input to the EVS system manager 110 can be generated and used as a control input.

Returning to FIG. 5, according to one exemplary embodiment, the EVS system manager 110 monitors the eye location input 360, the vehicle location and orientation input 371 and the user input location 312 to thereby generate the display requirements 330 for dynamically registering the graphic upon the graphic projection display. If the graphic includes an object or portion of a view in the operating environment of the vehicle, then the EVS system manager 110 will additionally require the sensor data representing the object or view. It is appreciated that if the graphic includes a feedback graphic representing, for example, a gaze location, gesture, or selection control feedback, it may only be necessary to monitor the eye location input 360 and the user input location 371 to generate the display requirements 330 for dynamically registering the feedback graphic upon the graphic projection display 250. A similar configuration, monitoring inputs 360, 371, and 312, can be used to determine a selected feature based upon the user input.

Figure 6:
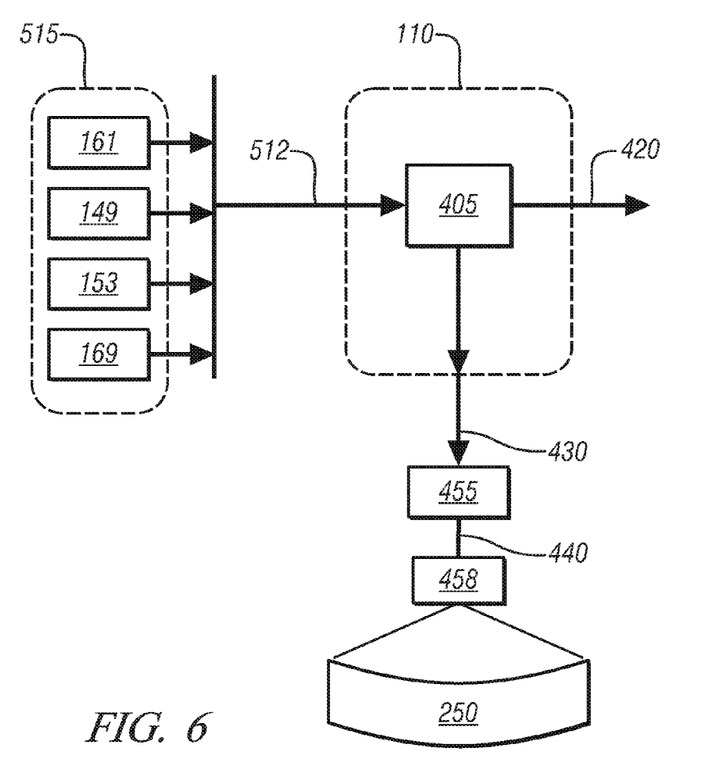
FIG. 6 illustrates an exemplary information flow to determine a graphic based upon inputs to an EVS system manager, in accordance with the present disclosure.

FIG. 6 illustrates an exemplary information flow to determine a graphic based upon inputs to EVS system manager 110. The illustrated process includes an EVS system manager 110 monitoring information from various sources and generating display requirements 430, graphics module 455 monitoring the display requirements 430 from the EVS system manager and generating graphics commands 440, and a graphics projection display 250, for example, including the exemplary display embodiments disclosed herein. FIG. 6 illustrates exemplary UIM 515 including imaging device 161, TSIM 149, controller device 153, and keyboard device 161 and outputting or contributing to user input 512. The EVS system manager 110 includes a command selection module 405, integrating user input 512 with other information available to the EVS system manager to provide any graphics required for command selection including selection prompts and feedback through display requirements 430. Additionally, if any vehicle commands or non-graphical output are required related to feature selection, for example, prompting an inquiry to a wireless network regarding a selected feature, signal 420 can be generated and utilized by the associated system. User input 512 can include user input location 312 or any other inputs that can convey a selection of a feature in the view in front of the vehicle.

Figure 7:
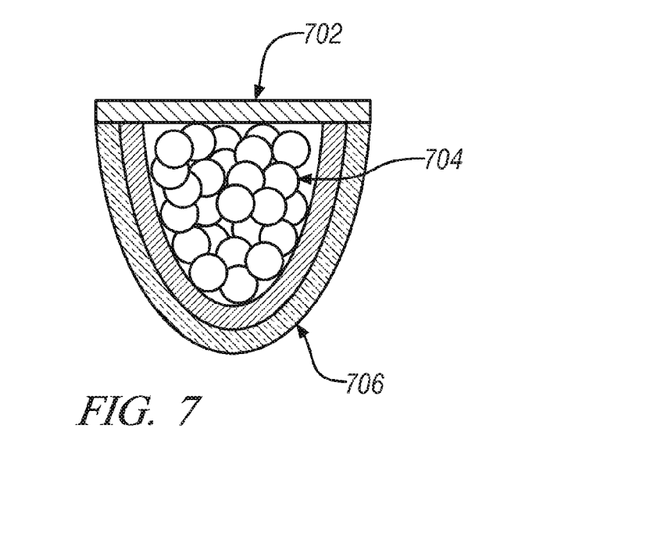
FIG. 7 illustrates an exemplary emitter, capable of emitting light to a limited field of view, in accordance with the present disclosure.
Figure 8:
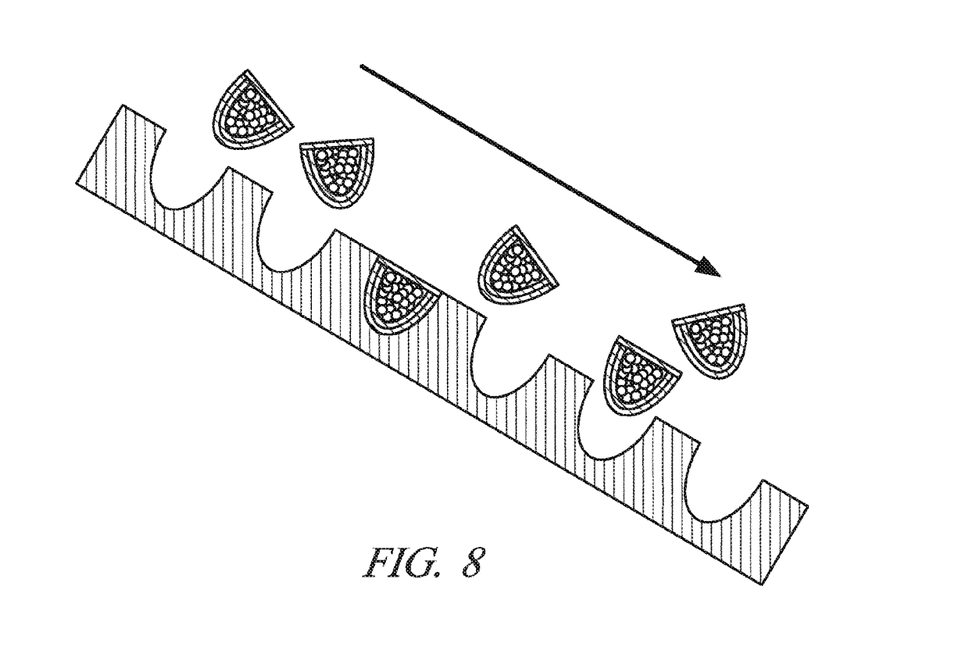
FIG. 8 illustrates an exemplary process to create the necessary structure of emitters aligned to a polymer substrate in order to enable limited field of view viewing, in accordance with the present disclosure.

Pixelated field of view limited architecture enables display of graphics to one occupant of the vehicle without displaying the graphics to another occupant. An exemplary embodiment of a pixelated field of view limited architecture enabling image view from a limited direction includes use of microstructures or an arrangement of particles accepting an excitation light and emitting light in a limited direction. Co-pending U.S. application Ser. No. 12/564,899, which is incorporated herein by reference discloses a pixelated field of view limited architecture. FIGS. 7 and 8 illustrate an exemplary use of a pixelated field of view limited architecture. FIG. 7 illustrates an exemplary emitter, capable of emitting light to a limited field of view. The exemplary emitter includes a UV transparent encapsulant 702, for example, made from $SiO_2$, filled with an LIF material 704 that fluoresces visible wavelengths when irradiated with ultraviolet radiation, with a parabola shaped narrow band multilayer reflection structure 706. In this exemplary embodiment, a thin film of these emitters is deposited as onto a polymer. In preparation for the film, impressions in the shape of parabolas similar to the shape formed in the emitters are embossed into the polymer material. The emitters are deposited by chemical vapor deposition onto the polymer substrate, filling the parabola impressions with emitters. FIG. 8 illustrates an exemplary process to create the necessary structure of emitters aligned to a polymer substrate in order to enable limited field of view viewing. By an exemplary process such as etching, free standing parabolas that are filled with emitting material are created by releasing them from the substrate. The removal from the polymer substrate can be also be accomplished by dissolving the plastic substrate with a suitable solvent. The free standing parabolas are then nested into divots that have been created in the glass substrate by photolithographic methods or embossing. The method of mating the parabola to the divot can be accomplished by a process such as fluidic self assembly, similar to that practiced by Alien Technology, wherein the parabolas are flowed over the substrate and parabola-divot mating occurs in a statistical fashion.

Based upon the methods discussed above including the method for dynamically registering a graphic discussed in FIG. 5, a dynamically registered graphic can be projected upon a graphic projection display 250 embodied in a substantially transparent windscreen head-up display 150 including a pixelated field of view limited architecture, with the graphics corresponding to the driving scene of the vehicle. The pixelated field of view enables graphic view from a limited direction (e.g., first limited direction and/or second limited direction). The dynamically registered graphic can include a first dynamically registered graphic based on a first viewer location and a second dynamically registered graphic based on a second viewer location. It is understood that both of the first and second dynamically registered graphics can be projected upon the substantially transparent windscreen HUD. Further, the first dynamically registered graphic based upon the first viewer location is further based upon utilizing the pixelated field of view enabling view of the graphic from a first limited direction oriented toward the first viewer location. It will be understood that the first viewer location can correspond to the driver of the vehicle. Likewise, the second dynamically registered graphic based upon the second viewer location is further based upon utilizing the pixelated field of view enabling view of the graphic from a second limited direction oriented toward the second viewer location. It will be understood that the second viewer location can correspond to one of the passenger seats in the vehicle. Likewise, the method of dynamic registration discussed in FIG. 5 can further include monitoring data related to a second viewer eye location, wherein the second viewer eye location corresponds to one of the passengers at the second viewer location. It is understood that monitoring an occupant eye location can include monitoring data related to a first viewer eye location and/or the second viewer eye location.

The method of pixelated field of view limited architecture as discussed above is applied to the substantially transparent windscreen HUD 150. However, this method can additionally be applied to the non-transparent components 280. For instance, a section of the instrument panel or of the support pillars could include a pixelated field of view limited architecture such that graphics could be represented to the user/operator of the vehicle and not to a passenger in the other front seat of the vehicle.

The above methods can be incorporated within an EVS system manager as indicated above. Such an EVS system manager can exist within a single control module or physical device or can alternatively be spanned across a number of modules or physical devices. The EVS system manager can take a number of different embodiments, and the disclosure is not intended to be limited to the particular exemplary embodiments of the EVS system manager disclosed herein. Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 9:
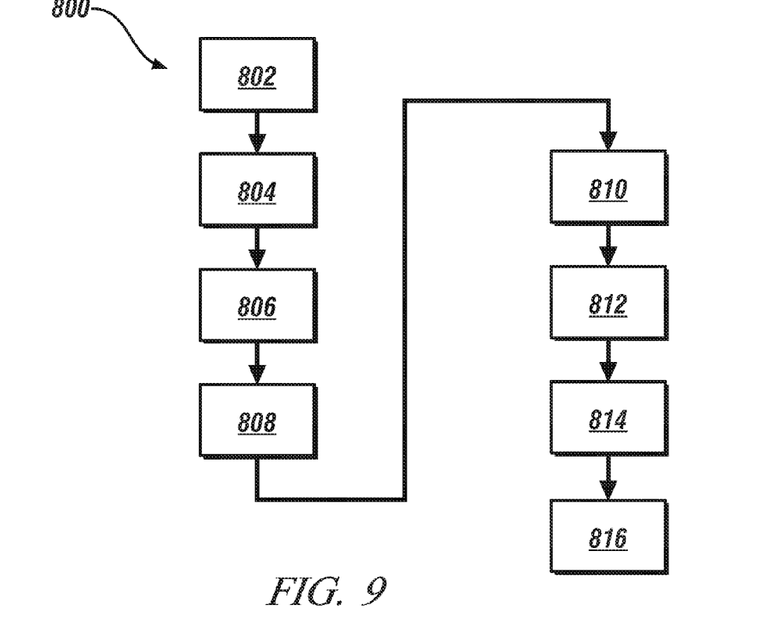
FIG. 9 illustrates an exemplary process to operate the methods disclosed herein, in accordance with the present disclosure.

FIG. 9 illustrates an exemplary process 800 to operate the methods disclosed herein. Exemplary steps to process 800 are represented in the following table.

TABLE 1

| Step | Description |
| --- | --- |
| 802 | Monitor a View in Front of the Vehicle |
| 804 | Monitor a User Input to a Portion of the View |
| 806 | Determine a Feature Selected by the User Input |
| 808 | Identify the Selected Feature |

TABLE 1-continued

| Step | Description |
| --- | --- |
| 810 | Query Information Regarding the Identified Feature Through a Wireless Network |
| 812 | Determine a Registered Graphic to Indicate Selection of the Feature |
| 814 | Determine a Graphic to Convey the Queried Information Regarding the Identified Feature |
| 816 | Display the Determined Graphics |

Process 800 starts at step 802 by monitoring a view in front of the vehicle. Such monitoring includes use a camera device, a radar device, and/or other devices capable of generating information regarding the view and features visible in the view. Step 804 monitors a user input to the view according to the methods disclosed above, for example, providing a point or an area or portion of the view that is selected. Step 806 applies methods, such as feature recognition methods, to determine a selected feature corresponding to the user input. In step 808, the selected feature is analyzed and identified (for example, as a road feature or a portion of a road that can be traveled upon, another vehicle, a building, a parking lot, an advertising sign or a sign indicating a possible navigation destination with identifiable text.) In step 810, the information about the identified feature is queried or accessed through a wireless connection, for example, through an internet based service. In step 812, a graphic that can be registered to the feature such as a cursor or a box representing selection of the feature is determined. In step 814, a graphic is determined to convey the information accessed regarding the identified feature to the user. In step 816, the determined graphics are displayed upon the graphic projection display 250. Process 800 is an exemplary, non-limiting embodiment to employ methods disclosed herein.

Figure 10:
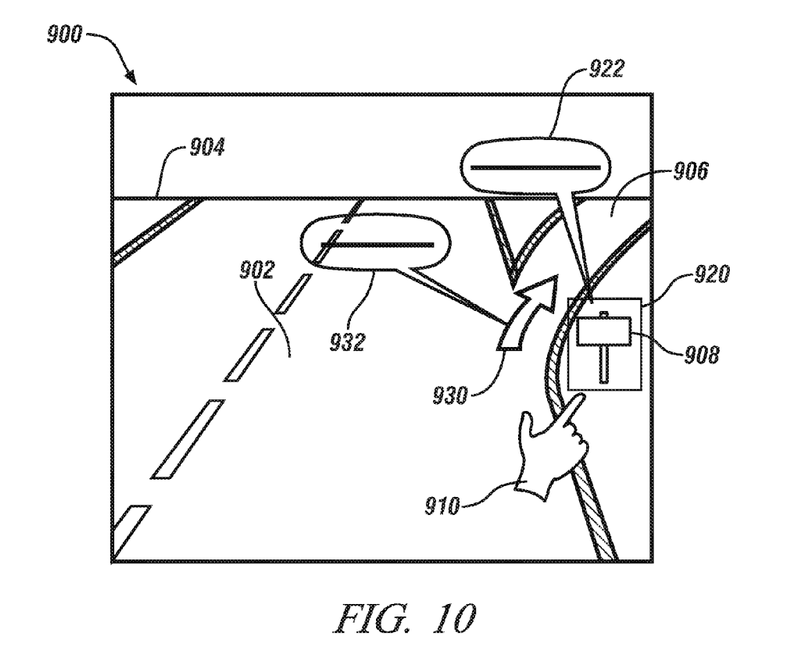
FIG. 10 illustrates an exemplary view through a transparent windscreen graphic projection display and user input to the display, in accordance with the present disclosure.

FIG. 10 illustrates an exemplary view through a transparent windscreen graphic projection display and user input to the display. Display 900 includes road surface 902, visible horizon 904, exit ramp 906, road sign 908, and exemplary user pointing to the display 910. In different embodiments, the view visible via display 900 can either be the actual view visible through a substantially transparent display or can be projected as part of the displayed graphics. FIG. 10 illustrates registered graphic 920 registered to road sign 908, located proximately to the user pointing to the display 910. As indicated above, a feature can be selected and identified based upon a location of a user input to the display. Graphic 920 indicates selection of road sign 908 as a selected feature of the view. Text 922 accompanying graphic 920 can additionally be displayed representing information queried about the selected feature, for example, information about options included on road sign 908. FIG. 10 illustrates registered graphic 930 and accompanying text 932 indicated to exit ramp 906. If more than one feature is proximate or close to the user input, methods are disclosed herein or known in the art to select between the candidate features to be displayed. In FIG. 10, both road sign 908 with registered graphic 920 in the form of a box around the sign and exit ramp 906 with an registered graphic 930 embodied as an arrow registered to the roadway are illustrated resulting from a user input. User pointing to the display 910 is monitored according to methods disclosed herein, and based upon the location of the input, a feature or features are selected for display.

The disclosure has described certain preferred embodiments and modifications thereto. Further modifications and alterations may occur to others upon reading and understanding the specification. Therefore, it is intended that the disclo-

The invention claimed is:

1. Method to select a feature in a view in front of a vehicle, the method comprising:
   monitoring the view in front of the vehicle visible through a graphic projection display, the graphic projection display always remaining static with respect to the view in front of the vehicle;
   monitoring a user input to the graphic projection display, the user input corresponding to a first viewer and indicated to a portion of the graphic projection display corresponding to a portion of the view in front of the vehicle that includes the feature;
   monitoring an eye location of the user;
   estimating a gaze location of the user based on the monitored eye location, the gaze location of the user describing a point on a transparent windscreen where eyes of the user are focused;
   selecting the feature based upon the monitored view, the gaze location of the user, and the monitored user input, wherein the feature is represented as viewed in the real environment in front of the vehicle;
   only after the feature is selected, ascertaining information related to the selected feature;
   determining a first registered graphic representing the ascertained information related to the selected feature for display upon the graphic projection display; and
   displaying the first registered graphic upon the graphic projection display, wherein displaying the first registered graphic upon the graphic projection display comprises projecting the first registered graphic and a second registered graphic upon a pixelated field of view limited architecture, comprising:
      monitoring a first location corresponding to the first viewer;
      monitoring a second location corresponding to a second viewer, wherein the first and second locations are configured on the interior of the vehicle;
      determining the second graphic representing the ascertained information related to the selected feature, wherein the first graphic is respective to the first location corresponding to the first viewer and the second graphic is respective to the second location corresponding to the second viewer;
      dynamically registering first and second viewer-defined locations of respective ones of the first and second graphics upon an interior side of the graphic projection display corresponding to the driving scene of the vehicle, comprising
         the first graphic dynamically registered at the first viewer-defined location upon the interior side of the graphic projection display to enable view of the first graphic only from a first limited direction oriented toward the first viewer location corresponding to the first viewer, and
         the second graphic dynamically registered at the second viewer-defined location upon the interior side of the graphic projection display to enable view of the second graphic only from a second limited direction oriented toward the second viewer location corresponding to the second viewer; and
      projecting the first and second graphics upon the interior side of the graphic projection display.

2. The method of claim 1, further comprising identifying the selected feature.

3. The method of claim 2, wherein identifying the selected feature comprises identifying the selected feature as a road feature.

4. The method of claim 2, wherein identifying the selected feature comprises identifying the selected feature as another vehicle.

5. The method of claim 2, wherein identifying the selected feature comprises identifying the selected feature as a building.

6. The method of claim 2, wherein identifying the selected feature comprises identifying the selected feature as a parking lot.

7. The method of claim 2, wherein identifying the selected feature comprises identifying the selected feature as an advertising sign.

8. The method of claim 2, wherein identifying the selected feature comprises identifying the selected feature as a sign indicating a potential navigation destination.

9. The method of claim 1, wherein the graphic projection display is a transparent windscreen head-up display.

10. The method of claim 9, wherein monitoring the user input to the graphic projection display comprises monitoring a hand gesture indicated to the graphic projection display;
   wherein determining the registered graphic representing the selected feature is further based upon the monitored hand gesture.

11. The method of claim 10, wherein monitoring the hand gesture comprises utilizing an imaging device to generate a three-dimensional mapping of the hand gesture.

12. The method of claim 11, wherein utilizing the imaging device to generate the three-dimensional mapping of the hand gesture comprises capturing images with a device utilizing one of infrared light, ultraviolet light, and a combination of infrared and ultraviolet light.

13. The method of claim 11, wherein utilizing the imaging device to generate the three-dimensional mapping of the hand gesture comprises utilizing a laser speckle pattern.

14. The method of claim 11, wherein utilizing the imaging device to generate the three-dimensional mapping of the hand gesture comprises utilizing pulsed modulation.

15. The method of claim 11, wherein utilizing the imaging device to generate the three-dimensional mapping of the hand gesture comprises illuminating the hand gesture with beams of radiation and generating the three-dimensional mapping based upon intensity-based mapping.

16. The method of claim 1, wherein the graphic projection display comprises a touch screen device displaying the view in front of the vehicle.

17. The method of claim 1, wherein the graphic projection display comprises a non-transparent surface comprising luminescent materials.

* * * * *